United States Patent [19]

Kim et al.

[11] Patent Number: 5,654,613
[45] Date of Patent: Aug. 5, 1997

[54] OVER DRIVE CONTROL APPARATUS OF DIRECT CURRENT SERIES MOTOR

[75] Inventors: Jong Gun Kim, Changwon; Seong Chul Huh, Taegu; Chang Soo Lee, Changwon, all of Rep. of Korea

[73] Assignee: Samsung Heavy Industries Co., Ltd., Seoul, Rep. of Korea

[21] Appl. No.: 564,828

[22] Filed: Nov. 29, 1995

[30] Foreign Application Priority Data

Apr. 29, 1995 [KR] Rep. of Korea ............ 95-10521

[51] Int. Cl.$^6$ .............................................. H02P 3/14
[52] U.S. Cl. ................... 318/139; 318/254; 318/258; 318/371; 318/376
[58] Field of Search ........................ 318/139, 296, 318/245, 287, 254, 376, 257, 372, 268, 370, 258, 371, 269, 373, 375, 379; 388/831

[56] References Cited

U.S. PATENT DOCUMENTS

| | | |
|---|---|---|
| 3,872,367 | 3/1975 | Kuriyama et al. ............ 318/373 |
| 4,124,812 | 11/1978 | Naito et al. ............ 318/371 |
| 4,195,254 | 3/1980 | Gurwicz et al. ............ 318/434 |
| 4,388,573 | 6/1983 | Horiuchi et al. ............ 318/376 |
| 4,418,778 | 12/1983 | Sato et al. ............ 318/139 |
| 4,422,021 | 12/1983 | Schwarz ............ 318/376 |
| 4,423,363 | 12/1983 | Clark et al. ............ 318/375 |
| 4,427,928 | 1/1984 | Kuriyama et al. ............ 318/139 |
| 4,479,080 | 10/1984 | Lambert ............ 318/373 |
| 4,514,665 | 4/1985 | Melocik et al. ............ 318/139 |
| 4,804,893 | 2/1989 | Melocik ............ 318/258 |
| 4,864,284 | 9/1989 | Crayton et al. ............ 318/605 |
| 5,119,011 | 6/1992 | Lambert ............ 318/139 |
| 5,136,219 | 8/1992 | Takashashi et al. ............ 318/139 |

*Primary Examiner*—Paul Ip
*Attorney, Agent, or Firm*—Kenyon & Kenyon

[57] ABSTRACT

The invention is made to provide a reliable driving system by solving the problem of the conventional apparatus caused by unstable current in the chopper transistor located at the low end of the field winding and armature winding. The over drive control apparatus of the direct current series motor of the present invention, including the field winding and armature winding and driven by power from the battery, comprises a chopper transistor to which the battery is applied, and an over drive contactor connected between the chopper transistor and the field windings to switch the battery power from the chopper transistor to the field winding.

3 Claims, 2 Drawing Sheets

OVER DRIVE CONTROL APPARATUS OF DIRECT CURRENT SERIES MOTOR

BACKGROUND OF THE INVENTION

1. Field of the Invention

The present invention relates to an over drive control device of a direct current series motor and more particularly to the over drive control apparatus to stably control the speed of the over drive.

2. Description of the Prior Art

The over drive apparatus increases the number of rotations of the transmission axle to more than the base speed of the motor. This device is generally used in industrial electric vehicles to which a light load is applied for actuating the vehicles above the base speed to control the magnetic flux by adjusting the current amount in the field winding.

FIGS. 1 and 2 show a conventional over drive control apparatus.

The over drive apparatus shown in FIG. 1 comprises a field winding 3 for rotating the armature winding 2 by generating the magnetic field using power from the battery 1, forward and backward connector 4 for controlling the direction of rotations of the armature 2 by controlling the direction of the current in the field winding 3, chopper transistor 5 for switching the power from battery 1 either to the armature winding 2 or to the field winding 3, bypass contactor 6 for preventing instanteneous over-voltage in the chopper transistor 5 during conversion from normal state to over drive state, over drive transistor 7 for switching the power supply from the battery to the field winding 3, and a microcomputer 8 for performing over drive function by controlling the current amount to the field winding 3 in response to the control of the on-off operation of the chopper transistor 4 and by controlling the current flowing in the field winding 3 in response to the control of on-off operation of the over drive transistor 7.

In FIG. 2, the over drive transistor 7 is replaced with the over drive contactor 9 to select either the normal state or over drive state.

However, since the conventional over drive control apparatus as shown in FIG. 1 uses the over drive transistor 7 which is on-off controlled by the microcomputer 8 so as to control the over drive state, the driving control circuit is additionally required to drive the over drive transistor 7, thereby increasing the manufacturing cost.

Further, the armature winding 2 and field winding 3 is placed on top of the chopper transistor 5 and power from the battery 1 is directed through both the armature winding 2 and field winding 3 to the chopper transistor 5, by which the current amount in the chopper transistor 5 has become unstable. Accordingly, as the driving characteristic of the chopper transistor 5 become unstable, it has another problem that the control of the system becomes unreliable.

The over drive apparatus of FIG. 2 shows the use of the over drive contactor 9 instead of the over drive transistor 7 of FIG. 1. This reduced the manufacturing cost, however, the location of the armature winding 2 and the field winding 3 in front of the chopper transistor 5 cause the same problem in that the control of the system becomes unreliable.

SUMMARY OF THE INVENTION

Accordingly, it is an object of the present invention to solve the above problem and provide an over drive control apparatus of the direct current series motor that enables a reliable speed control of the over drive.

The over drive control apparatus of the direct current series motor, including the field winding and armature winding and driven by power from the battery, comprises a chopper transistor to which the battery is applied, and an over drive contactor connected between the chopper transistor and the field windings to switch the battery power from the chopper transistor to the field winding.

DETAILED DESCRIPTION OF PREFERRED EMBODIMENT

A preferred embodiment of the over drive control apparatus of direct current series motor according to the present invention will be hereafter described in detail with a reference to figures attached.

Figure 1:
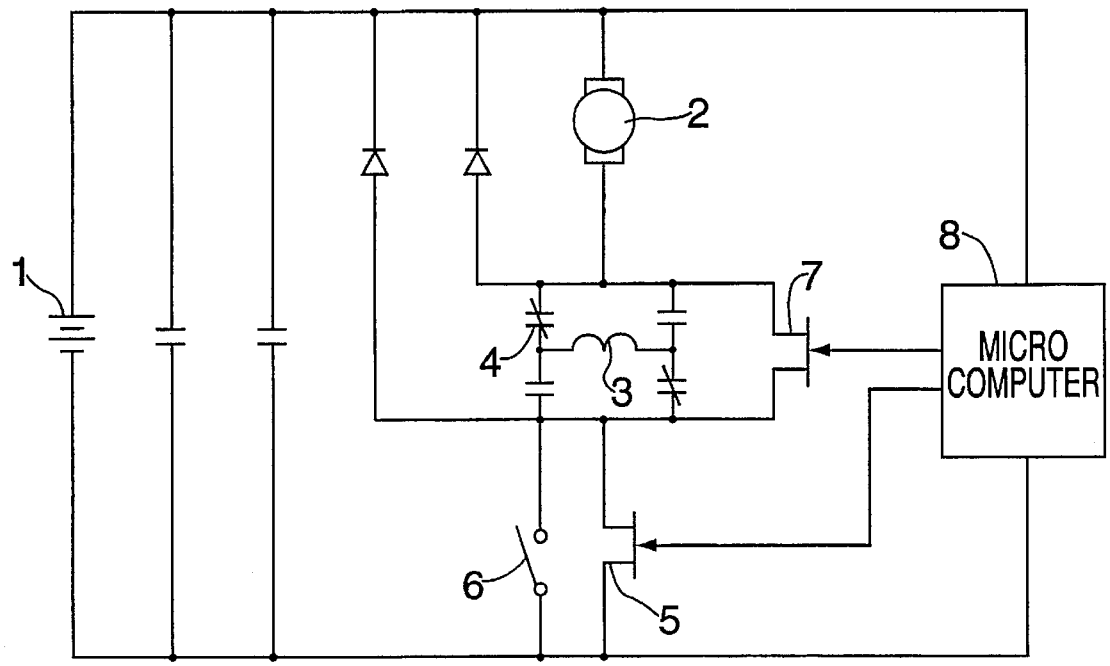
FIGS. 1 and 2 are circuit diagrams of conventional over drive control apparatus.
Figure 2:
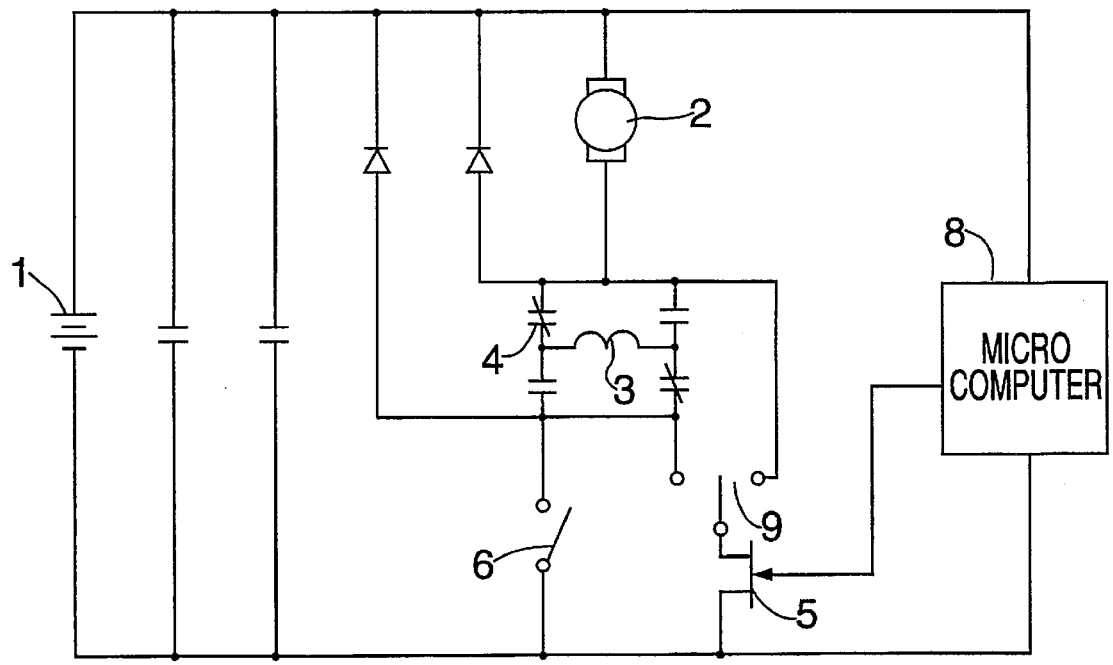
Figure 3:
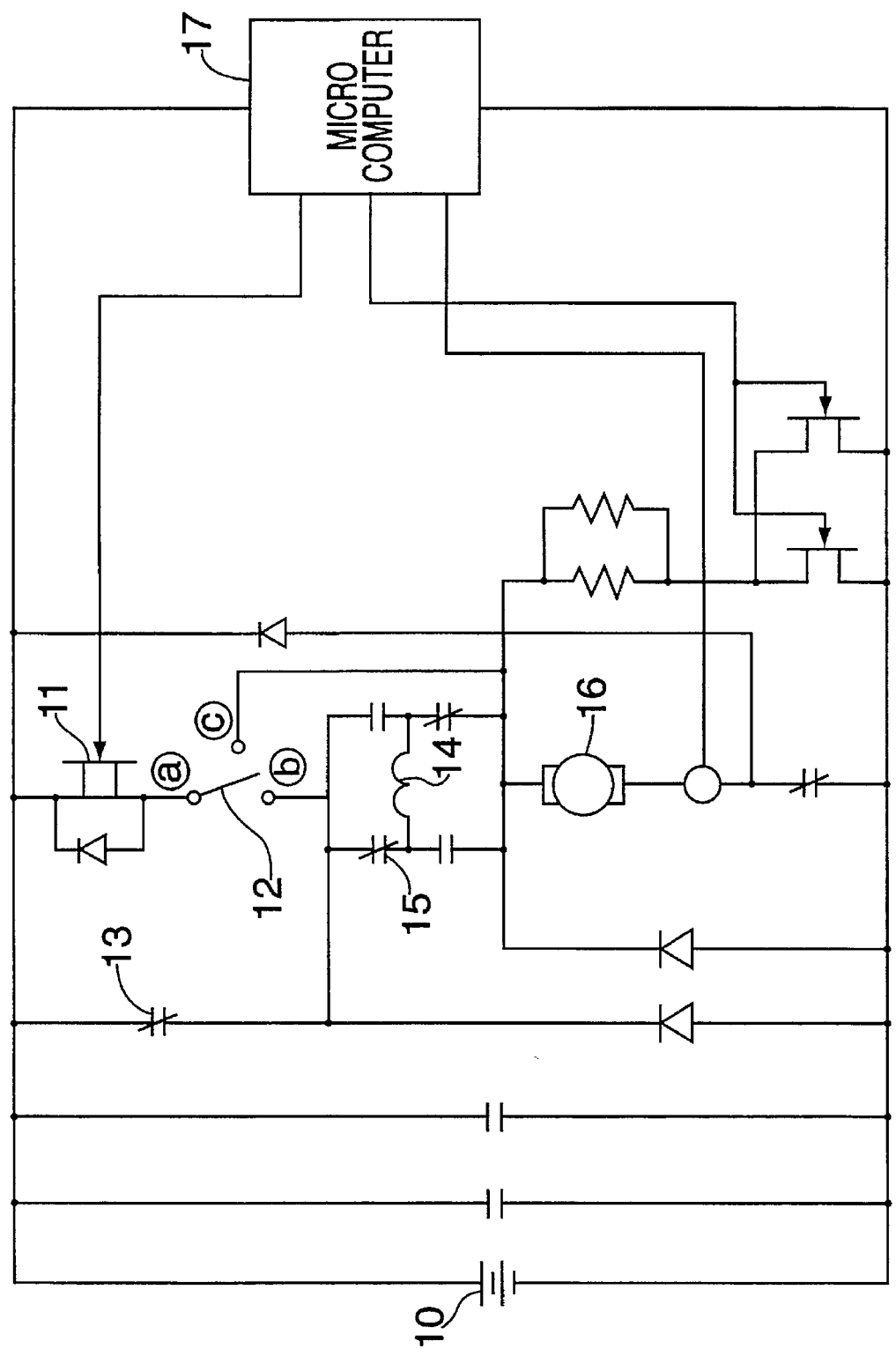
FIG. 3 is a circuit diagram of the over drive control apparatus of the direct current series motor according to the present invention.

FIG. 3 shows a chopper transistor 11 to switch power from the battery 10, an over drive contactor 12 serially connected to the chopper transistor for selecting a normal or over drive state, bypass contactor 13 connected in parallel to the chopper transistor 11 in order to prevent bursting of the chopper transistor 11 due to the overvoltage by the conversion from the normal to over drive state, and the field winding 14 serially connected to the over drive contactor 12 and magnetized by the battery power, forward and backward contactor 15 connected with both left and right sides of the field winding 14 in order to control the direction of current in the field winding 14, the armature winding 16 in which the direction of the rotation is controlled by forward and backward contactor 15 and the rotation happens by the flux of the field winding 14 and to which the field winding 14 is serially connected and, a microcomputer 17 to control the on-off operation of the chopper transistor 11.

When the electric vehicle is driven in the normal state, the over drive contactor 12 is set with a terminal A and terminal B connected. In this case, power from the battery 10 is supplied to the chopper transistor 11 and the microcomputer 17 turns on the chopper transistor 11 by outputting the control signal. Accordingly, the battery power is supplied from chopper transistor 11→terminals (a) and (b) of the over drive contactor 12→forward and backward contactor 15→field winding 14→armature winding 16, so that the electrical vehicle travels at the driving speed of the normal state.

If the user selects the over drive function, the instantaneous over-voltage flows in the chopper transistor 11 as the normal state is changed to the over drive state. In order to prevent the over-voltage, the microcomputer 17 turns off the chopper transistor 11 for a predetermined time and turns on the bypass contactor 13. Therefore, battery power flows through bypass contactor 13→forward and backward contactor 15→field winding 14 and armature winding 16, without passing through the chopper transistor 11.

Then, when the battery power stabilizes, the microcomputer 17 turns off the bypass contactor 13 and turns on the chopper transistor 11 instead. In this case, the over drive contactor 12 is in a state with terminals (a) and (c) connected to each other because the over drive function is chosen by the user. Accordingly, the battery power flows through chopper transistor 11→terminals (a) and (c) of the over drive contactor 12→armature winding 16. Therefore the current amount in the field winding 14 is reduced to obtain the speed of the electric vehicles is above the rated speed.

Below is an equation (1) to express the motor driving in a normal state.

$$W_M = \frac{V_B - R_A \times I_A - R_F \times I_F}{K_V \times I_A} \quad (1)$$

Here, $W_M$: rotations of the motor $V_B$: voltage of battery $R_A$: resistance of the armature $R_F$: resistance of the field winding $I_A$: current in the armature winding $I_F$: current in the field winding $K_V$: counter electromotive force As shown in the equation 1, the speed of the motor is influenced by both the amount of current in the field winding 14 and the value of resistance of the field winding 14.

If the user selects the over drive function, terminals (a) and (c) are connected in the over drive contactor 12 and the current would not flow in the field winding 14. Equation (2) is expressed as follows.

$$W_M = \frac{V_B - R_A \times I_A}{K_V \times I_A} \quad (2)$$

The number of rotations of the motor in equation 2 increases to more than equation 1 to perform the over drive function. In this case, battery power is supplied to the field winding 14 and armature winding 16 after controlling the current amount so that the stable current is supplied with the chopper transistor 11, thereby achieving reliable control of the system by the chopper transistor 11.

In the over drive control apparatus of the direct current series motor of the present invention, the chopper transistor is located between the front of the armature winding and the field winding to enable the amount of current in the chopper transistor stable, so that reliable control in performing the over drive function is obtained.

What is claimed is:

1. An over drive control apparatus for a direct current series motor including a field winding and an armature winding and driven by power from a battery, comprising:

a chopper transistor to which the battery is applied; and an over drive contactor connected between the chopper transistor and the field winding to switch the battery power from the chopper transistor to the field winding.

2. An over drive control apparatus for a direct current series motor including a field winding and an armature winding and driven by a power supply, comprising:

a chopper transistor in electrical communication with the power supply; and an over drive contactor connected in series with the chopper transistor wherein;

in a first position, the over drive contactor provides an electrical path from the chopper transistor to the field winding, and in a second position, the over drive contactor provides an electrical path from the chopper transistor to the armature winding.

3. An over drive control apparatus for a direct current series motor driven by a power supply and having an armature winding and a field winding with forward and backward contactors for reversing a direction of a current in the field winding, comprising:

a chopper transistor in electrical communication with the power supply; and an over drive contactor connected in series with the chopper transistor wherein;

in a first position, the over drive contactor provides an electrical path from the chopper transistor to the forward and backward contactors of the field winding, and in a second position, the over drive contactor provides an electrical path from the chopper transistor to the armature winding.

* * * * *